United States Patent
Hong

(10) Patent No.: US 6,980,739 B1
(45) Date of Patent: Dec. 27, 2005

(54) METHOD FOR GAIN CONTROL OF FIBEROPTIC REPEATING SYSTEM

(75) Inventor: Ik Pyo Hong, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/469,308

(22) Filed: Dec. 22, 1999

(30) Foreign Application Priority Data

Dec. 26, 1998 (KR) .................. 1998/58910

(51) Int. Cl.$^7$ .................. H04B 10/08; H04B 17/00; H04B 10/00
(52) U.S. Cl. .................. 398/32; 398/158
(58) Field of Search .................. 359/174–179; 379/56.1, 56.2; 370/247, 310.1, 310.2; 398/173, 398/115, 28, 32, 33, 158

(56) References Cited

U.S. PATENT DOCUMENTS

| | | | |
|---|---|---|---|
| 3,942,137 A * | 3/1976 | Franco et al. .................. | 333/16 |
| 4,006,320 A * | 2/1977 | Markl .................. | 324/532 |
| 4,025,737 A * | 5/1977 | Brewer .................. | 370/243 |
| 4,187,415 A * | 2/1980 | Boutmy et al. .................. | 370/243 |
| 4,281,408 A * | 7/1981 | Bonnerot .................. | 370/484 |
| 4,317,010 A * | 2/1982 | Fillot .................. | 370/243 |
| 4,617,656 A * | 10/1986 | Kobayashi et al. .................. | 370/445 |
| 4,896,317 A * | 1/1990 | Nakama et al. .................. | 370/247 |
| 5,159,479 A * | 10/1992 | Takagi .................. | 359/113 |
| 5,440,418 A * | 8/1995 | Ishimura et al. .................. | 359/110 |
| 5,463,487 A * | 10/1995 | Epworth .................. | 359/124 |
| 5,654,816 A * | 8/1997 | Fishman .................. | 359/110 |
| 5,689,355 A * | 11/1997 | Okubo et al. .................. | 359/145 |
| 5,841,563 A * | 11/1998 | Effenberger .................. | 348/533 |
| 5,969,837 A * | 10/1999 | Farber et al. .................. | 379/56.2 |
| 6,005,884 A * | 12/1999 | Cook et al. .................. | 370/338 |
| 6,009,324 A * | 12/1999 | Pravitz et al. .................. | 455/423 |
| 6,031,648 A * | 2/2000 | Javitt et al. .................. | 398/32 |
| 6,337,754 B1 * | 1/2002 | Imajo .................. | 359/145 |

* cited by examiner

Primary Examiner—Jason Chan
Assistant Examiner—Shi K. Li
(74) Attorney, Agent, or Firm—Fleshner & Kim, LLP

(57) ABSTRACT

A method of gain control in a fiberoptic repeating system is disclosed. By the present invention, the signal levels of an optical cable can be frequently monitored without affecting the control operations of the base station. Thus, damped signal levels can effectively be compensated.

10 Claims, 4 Drawing Sheets

METHOD FOR GAIN CONTROL OF FIBEROPTIC REPEATING SYSTEM

FIELD OF THE INVENTION

The present invention relates to a fiberoptic repeating system, and more particularly to a method for a gain control in a fiberoptic repeating system in a communication system.

BACKGROUND OF THE INVENTION

Generally, areas such as mountains, valleys and underground receive a weak transmission or are isolated completely from any radio waves due to the geographical situation. Thus, many base stations must be constructed to provide communication services in these shaded areas, requiring costly equipments and management. As the demand for communication services rises, the cost also increases, thereby creating a problem.

As one solution to this problems, a fiberoptic repeating system has been proposed and is currently being used commercially. However, a considerable amount of signal damping results in the optical cables of such a fiberoptic repeating system. Therefore, to compensate the signal damping, a gain control unit has also been proposed for the fiberoptic repeating system.

A fiberoptic repeating system in the related art generally includes a base station 1, a master repeater 2, and one of a plurality of a slave repeaters 3, as shown in FIG. 1. The slave repeater 3 receives and/or transmits RF signals within a remote region, and the master repeater 2 relays data between the base station 2 and the slave repeater 3.

More specifically, the master repeater 2 includes a driver amplifier 20 which amplifies an RF signal transmitted from the base station 1; an optic/RF converter 23 which converts from an amplified RF signal received through the driver amplifier 20 into an optic signal for transmission through an optical cable 4 or from an optic signal transmitted through the optical cable 4 into an RF signal; a master repeater controller 21 which monitors an operational state of the elements of the master repeater 2, controls the operation of the master repeater 2 or the slave repeater 3 according to a control signal of the base station 1, detects a level of RF signal amplified through the driver amplifier 20 and outputs the detected level as a digital reference value; and a MODEM 22 which modulates the output of the master repeater controller 21 and transmits the output to the slave repeater 3 side through the optic/RF converter 23.

The slave repeater 3 includes an optic/RF converter 31 which converts an optic signal transmitted through the optical cable 4 into an RF signal or converts an RF signal received through a receiving antenna into an optic signal for transmission through the optical cable 4; a driver amplifier 30 and a high-power amplifier 34 which amplifies an output of the optic/RF converter 31; a low noise amplifier 35 which amplifies the RF signal received through the receiving antenna and transmits the amplified RF signal to the optic/RF converter 31; a MODEM 32 which demodulates the digital reference signal received through the optic/RF converter 31; and a slave repeater controller 33 which detects a level of the RF signal received through the optic/RF converter 31, compares the detected level with a digital reference value transmitted through the MODEM 32, and adjusts a gain level of the driver amplifier 30 to compensate the difference.

The signal transmission and reception operations in the fiberoptic system of FIG. 1 is as follows.

An RF signal is received through a receiving antenna of the slave repeater 3 and is amplified by a constant level through the low noise amplifier 35. The amplified RF signal is then transmitted to the base station 1 via the optic/RF converters 31 and 23. Thereafter, the base station 1 transmits a corresponding RF signal to an appropriate terminal of a receiving party via the master repeater 2 and the slave repeater 3.

Particularly, the RF signal transmitted by the base station 1 is amplified by a constant level through the driver amplifier 20, and is converted into an optic signal through the optic/RF converter 23. Also, the master repeater controller 21 periodically detects a level of the RF signal output from the driver amplifier 20, converts the detected level into a digital MODEM RF signal level, modulates the digital MODEM RF signal level through the MODEM 22, and transmits the modulated digital MODEM RF signal level through the optic/RF converter 23.

The optic signal transmitted by the optic/RF converter 23 is demodulated into a digital MODEM RF signal through the optic/RF converter 31 and the MODEM 32 of the slave repeater 3, and is input to the slave repeater controller 33. The slave repeater controller 33 stores the level of the digital MODEM RF signal as a reference level. Also, the optic signal transmitted by the optic/RF converter 23 is converted into a RF signal through the optic/RF converter 31 and input to the driver amplifier 30. Thus, the slave repeater controller 33 converts the RF signal input to the driver amplifier 30 into a digital signal, compares the level of the digital signal with the reference level, and controls a gain level of the driver amplifier 30 to compensate a damping of the RF signal level by the differential value. Accordingly, the RF signal with a compensated signal level is amplified into a radio-transmittable level by the high power amplifier 34, and is transmitted to a corresponding terminal through the transmission antenna.

Furthermore, the master repeater controller 21 of the master repeater 2 and the slave repeater controller 33 of the slave repeater 3 respectively monitor the operational states of elements 20~23 and 31~35. Accordingly, when a specific control signal, e.g. a gain control signal of the slave repeater 3, is transmitted from the base station 1 to the master repeater 2, the master repeater controller 21 modulates the corresponding gain control signal through the MODEM 22 and transmits the modulated gain control signal to the slave repeater 3. The slave repeater controller 33 demodulates the gain control signal through the MODEM 32, reads the content of the gain control signal and controls a gain of the driver amplifier 30.

In the fiberoptic repeating system as described above, the RF signal levels are periodically detected and become reference signals for calculation of the damping rates of the RF signal levels to compensate the gain damping. Thus, the intervals for the periodic detection of the reference levels must be short in order to deal with the frequent change of the RF signal levels. As a result, the control operations of a base station cannot always be executed for each determination of the reference level within the given interval.

SUMMARY OF THE INVENTION

Accordingly, an object of the present invention is to solve at least the problems and disadvantages of the related art.

A primary object of the present invention is to provide a method for a gain control of a fiberoptic repeating system capable of frequently monitoring the signal levels of an optical cable, without influencing the control operation of a base station, to thereby compensating a damping the signal levels.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a method for gain control in a fiberoptic repeating system composed of a base station, a master repeater and a slave repeater comprises: detecting MODEM modulation signal levels of the master repeater transmitted via an optical cable from a controller of the slave repeater; comparing the MODEM modulation signal levels with a reference level and calculating the differential values; and controlling a gain of the amplifier for an RF signal amplification so as to correspond to the calculated differential value, and compensating the damping of RF signals transmitted from the master repeater to the slave repeater.

BRIEF DESCRIPTION OF THE DRAWING

The invention will be described in detail with reference to the following drawings in which like reference numerals refer to like elements wherein.

DETAILED DESCRIPTION OF THE INVENTION

Reference will now be made in detail to the preferred embodiments of the present invention, examples of which are illustrated in the accompanying drawings.

Figure 1:
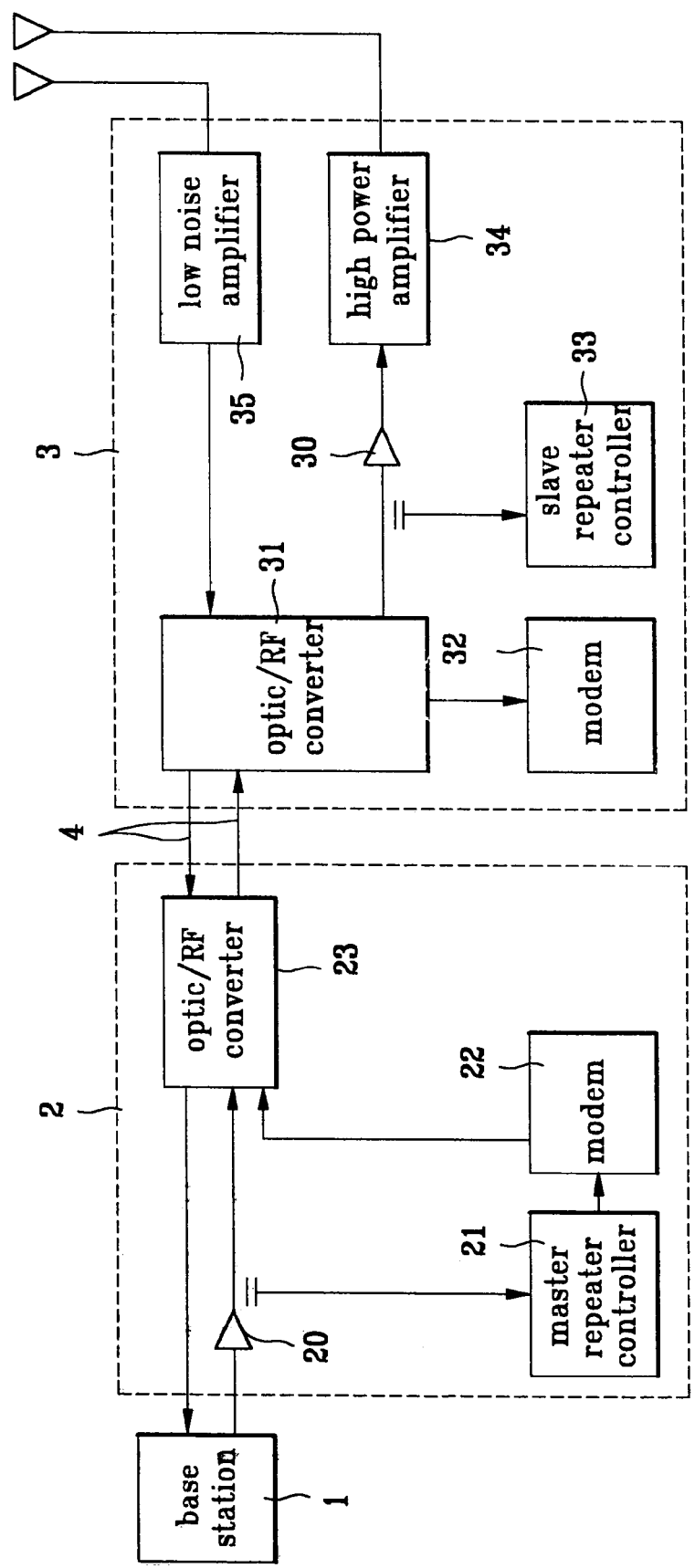
FIG. 1 is a block diagram of a fiberoptic repeating system in the related art.
Figure 2:
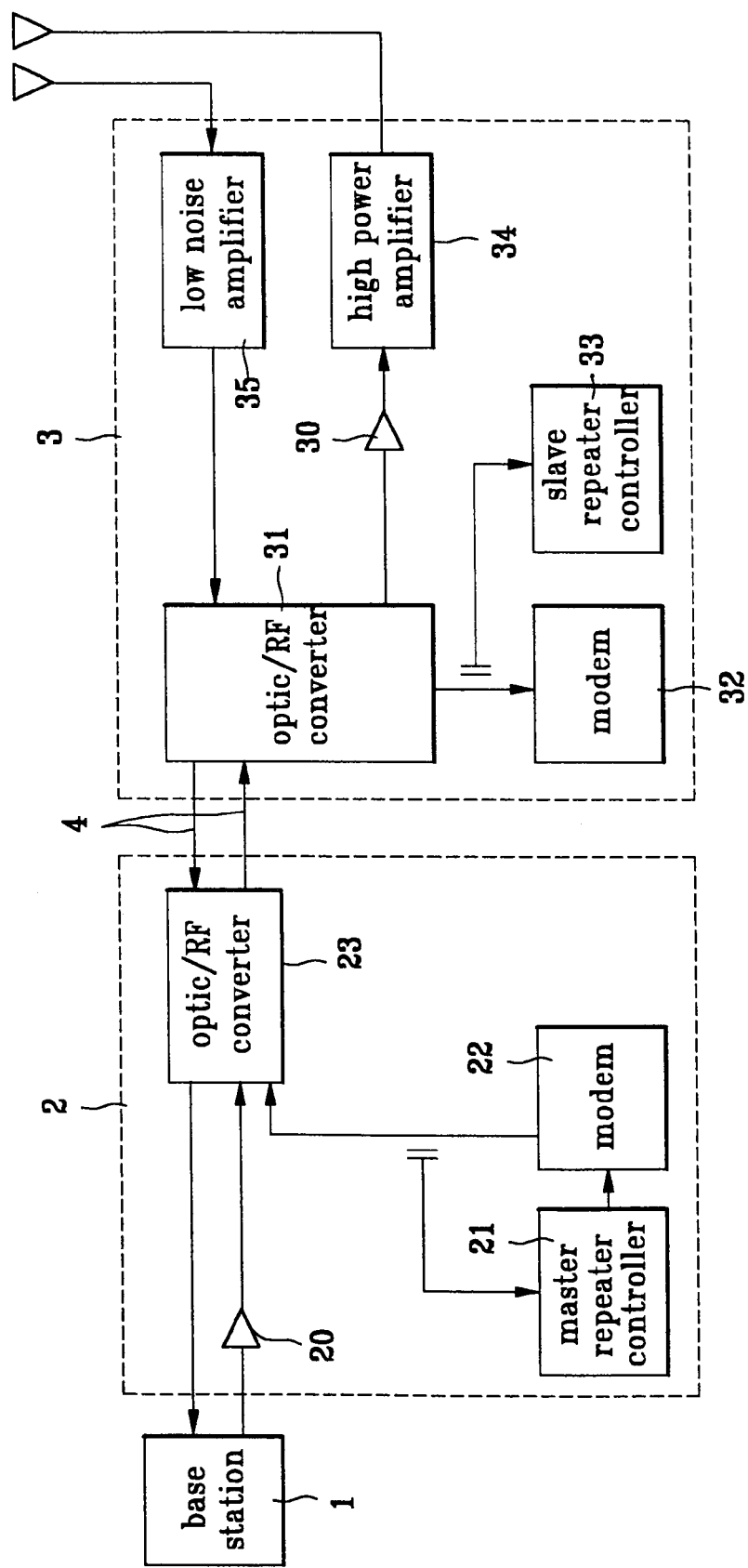
FIG. 2 is a block diagram of a fiberoptic repeating system in accordance with the present invention.
Figure 3:
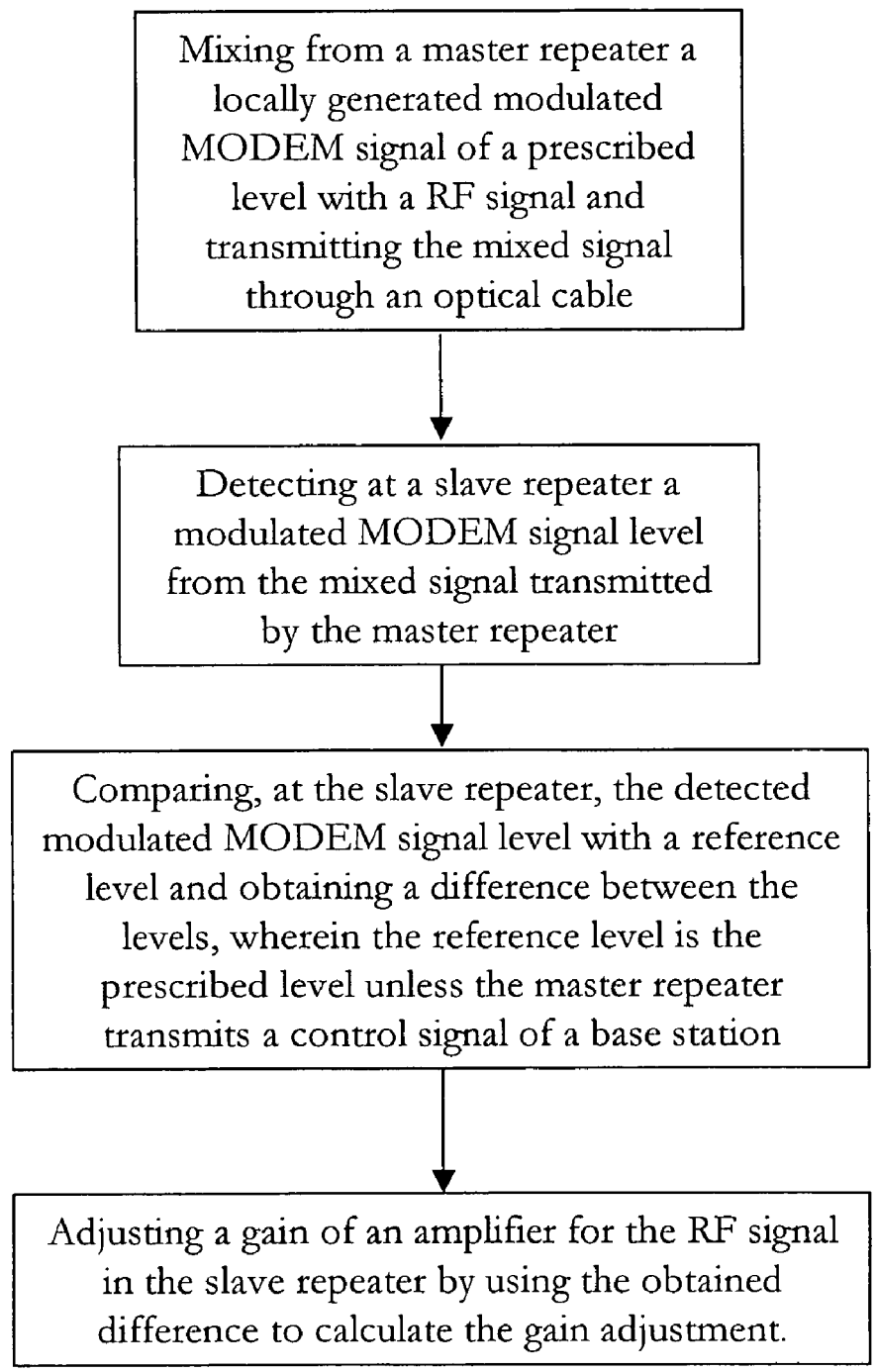
FIGS. 3 and 4 are drawings illustrating a method according to preferred embodiments of the present invention.
Figure 4:
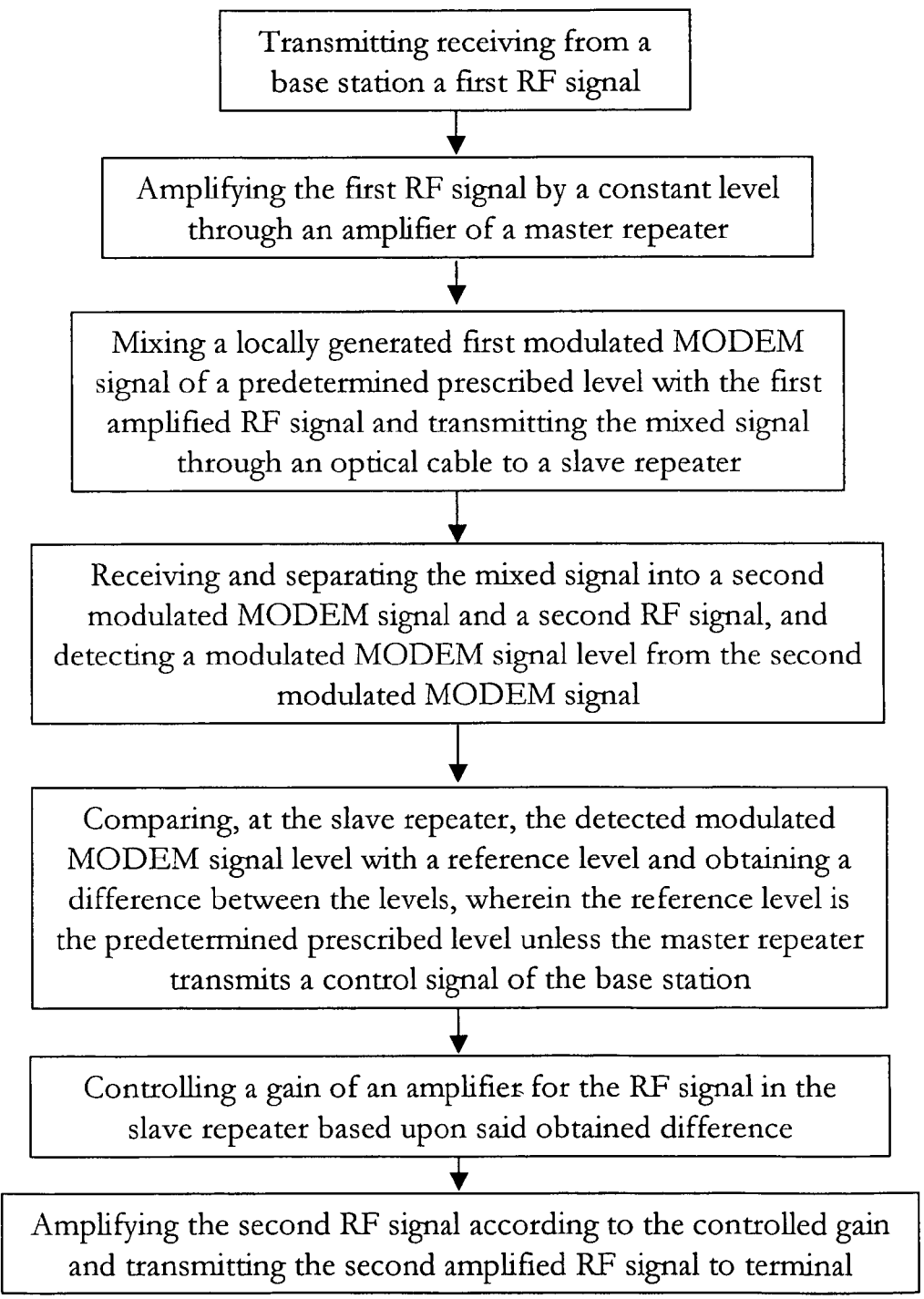

FIG. 2 is a block diagram showing the construction of the fiberoptic repeating system according to the present invention. Referring to FIG. 2, the present fiberoptic repeating system includes a master repeater 2 and a slave repeater 3 with respectively the same elements 20~23 and 30~35 as the master repeater 2 and the slave repeater 3 of the fiberoptic repeating system of FIG. 1. In the present fiberoptic repeating system, however, the amplified level of RF signal within the master repeater 2 is not detected. Also, the level of RF signal input to the driver amplifier 30 is not detected from the RF signal reception line. In the present invention, the modulated MODEM signal output by the optical/RF converter 31 is detected.

The remaining functions of elements 20~23 and 30~35 of the present fiberoptic repeating system in FIG. 2 operates in the same manner as the corresponding elements of the fiberoptic repeating system as described with reference to FIG. 1. The transmission and reception operations of signals in the fiberoptic repeating system according to the present invention is as follows.

An RF signal is received through a receiving antenna of the slave repeater 3 and is amplified by a constant level through the low noise amplifier 35. The amplified RF signal is then transmitted to the base station 1 via the optic/RF converters 31 and 23. Thereafter, the base station 1 transmits a corresponding RF signal to an appropriate terminal of a receiving party via the master repeater 2 and the slave repeater 3.

The RF signal transmitted by the base station 1 is amplified by a constant level through the driver amplifier 20, and is converted into an optic signal through the optic/RF converter 23. Also, a modulated MODEM signal of a constant level is output from the MODEM 22 unless the master repeater controller 21 transmits a control signal of the base station 1. Thus, the modulated MODEM signal of a predetermined level is mixed with the RF signal from the driver amplifier 20 and converted into an optic signal through the optic/RF converter 23.

The optic signal converted by the optic/RF converter 23 is damped by a constant level during the transmission through the optical cable 4. The damped optical signal is converted into an electric signal, and is separated into an RF signal and a modulation MODEM signal through the optic/RF converter 31. Subsequently, the RF signal is transmitted to a driver amplifier 30 through an interior transmission line, and the modulated MODEM signal is transmitted to the slave repeater controller 33 through the MODEM 32.

In the preferred embodiment, the output level of the MODEM 22 is a predetermined value, which is known by the slave repeater controller 33, unless the master repeater controller 21 transmits a control signal of the base station 1. Thus, after detecting a level of the modulated MODEM signal damped through the optical cable 4, a difference between the modulated MODEM signal level and the output level of the MODEM 22 can be obtained.

Because the signals are transmitted through the same optical cable 4, the modulated MODEM signal and the RF signal are affected by a same damping rate. Accordingly, the slave repeater controller 33 controls an amplification gain of the driver amplifier 30 using the obtained difference between the modulated MODEM signal level and the output level of the MODEM 22. Namely, the slave repeater controller 33 controls the amplification gain to increase the RF signal level by the obtained difference, thereby compensating the damped signal level.

Therefore, RF signal transmitted to the driver amplifier 30 is amplified by the amplification gain controlled by the slave repeater controller 33, and is also amplified in a radio-transmissible signal level through a high power amplifier 34. The amplified RF signal is then transmitted to a corresponding terminal through a transmission antenna.

The master repeater controller 21 of the master repeater 2 and the slave repeater controller 33 of the slave repeater 3 respectively monitor the operational state of elements 20~23 and 33~35. Moreover, when a specific control signal, e.g. a gain control signal of the slave repeater 3, is transmitted from the base station 1 to the master repeater 2, the master repeater controller 21 of the master repeater 2 modulates the corresponding gain control signal through the MODEM 22 and transmits it to the slave repeater 3. Thereafter, the slave repeater 3 demodulates it through the MODEM 32, reads the content of the control and controls a gain of a corresponding driver amplifier 30.

In sum, in the method for gain control in the fiberoptic repeating system of present invention, consequently, a MODEM modulated signal of a constant level is always detected regardless of a signal transmission from the base station. This allows a knowledge of a damping rate, and according to that, an amplification gain is controlled. Therefore, a fast gain compensation can be executed to increase the efficiency in a signal transmission.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for a gain control of a fiberoptic repeating system comprising:
   determining whether a control signal of a base station has been received;
   outputting a locally generated modulated MODEM signal at a predetermined level based on whether the control signal of the base station has been received, and if the control signal has been received outputting the MODEM signal at a level different from said predetermined level;
   if the control signal has not been received, mixing from a master repeater the locally generated modulated MODEM signal of said predetermined level with a RF signal and transmitting the mixed signal through an optical cable;
   detecting at a slave repeater a modulated MODEM signal level from the mixed signal transmitted by the master repeater;
   comparing, at the slave repeater, the detected modulated MODEM signal level with a reference level and obtaining a difference between the levels, wherein the reference level corresponds to said predetermined level unless the master repeater transmits the control signal of the base station; and
   adjusting a gain of an amplifier for the RF signal in the slave repeater by using the obtained difference to calculate the gain adjustment, wherein the modulated MODEM signal is generated independently from the RF signal.

2. A method of claim 1, wherein the modulated MODEM signal is detected by a controller of a slave repeater.

3. A method of claim 1, wherein controlling the gain of the amplifier comprises increasing a level of the RF signal by the obtained difference.

4. A method for a fiberoptic repeating system comprising:
   receiving from a base station a first RF signal;
   amplifying the first RF signal by a constant level through an amplifier of a master repeater;
   determining whether a control signal of the base station has been received;
   outputting a locally generated first modulated MODEM signal at a predetermined level based on whether the control signal of the base station has been received, and if the control signal has been received outputting the first MODEM signal at a level different from said predetermined level;
   if the control signal has not been received, mixing the locally generated first modulated MODEM signal of said predetermined level with the first amplified RF signal and transmitting the mixed signal through an optical cable to a slave repeater;
   receiving and separating the mixed signal into a second modulated MODEM signal and a second RF signal, and detecting a modulated MODEM signal level from the second modulated MODEM signal;
   comparing, at the slave repeater, the modulated MODEM signal level with a reference level and obtaining a difference between the levels, wherein the reference level corresponds to said predetermined level unless the master repeater transmits a control signal of the base station;
   controlling a gain of an amplifier for the RF signal in the slave repeater based upon said obtained difference; and
   amplifying the second RF signal according to the controlled gain and transmitting the second amplified RF signal to terminal, wherein the first modulated MODEM signal is generate independently from the RF signal.

5. A method of claim 4, wherein the modulated MODEM signal level is detected by a controller of the slave repeater.

6. A method of claim 4, wherein controlling the gain of the amplifier for the RF signal in the slave repeater comprises increasing a level of the second RF signal by the obtained difference.

7. A method of controlling gain in a fiberoptic communication system, comprising:
   determining whether a control signal of a base station has been received;
   outputting a locally generated monitoring signal of a predetermined level based on whether the control signal of the base station has been received, and if the control signal has been received outputting the monitoring signal at a level different from said predetermined level;
   if the control signal has not been received, combining the locally generated monitoring signal of said predetermined level with an RF signal, wherein the monitoring signal comprises a modulated gain control signal;
   transmitting the combined monitoring and RF signals to a slave repeater;
   receiving and separating the transmitted monitoring signal from the transmitted RF signal at the slave repeater;
   comparing, at the slave repeater, a level of the received monitoring signal with said predetermined level; and
   adjusting a gain applied to the received RF signal by using a result of the comparison to calculate the gain adjustment, wherein the monitoring signal is generated independently from the RF signal.

8. The method claim 7, wherein the transmitting step comprises:
   converting the combined monitoring and RF signals into an optical signal; and
   transmitting the optical signal to the slave repeater via an optical fiber.

9. An optical repeater system, comprising:
   a master repeater configured to receive an RF signal and generate a modulated reference signal having a level determined based whether a control signal of a base station is received, wherein the reference signal has a predetermined level if the control signal is not received and has a level different from said predetermined level if the control signal is received, said master repeater further combining the RF signal with the modulated reference signal, and converting the mixed signal to an optical signal for transmission over an optical cable; and
   a slave repeater, configured to receive the optical signal from the optical cable, convert the optical signal to a received mixed signal, split the received mixed signal into a received RF signal and a received modulated signal, compare the received modulated signal to a reference value corresponding to said predetermined level unless the master repeater received the control signal of the base station, and amplify the received RF signal according to a result of the comparison, wherein the modulated reference signal is generated independently from the RF signal.

10. The optical repeater system of claim 9, wherein the master repeater comprises a modem to generate the modulated signal, and wherein the slave repeater comprises a modem to demodulate the received modulated signal.

* * * * *